United States Patent
Rice

(10) Patent No.: US 9,635,736 B2
(45) Date of Patent: Apr. 25, 2017

(54) SYSTEM AND METHOD FOR PROVIDING DEVICE ACCESSORY ILLUMINATION BASED ON DEVICE-RELATED INFORMATION

(71) Applicant: Boogli Inc., Panama City Beach, FL (US)

(72) Inventor: Todd Rice, Panama City Beach, FL (US)

(73) Assignee: Boogli, Inc., Panama City Beach, FL (US)

( * ) Notice: Subject to any disclaimer, the term of this patent is extended or adjusted under 35 U.S.C. 154(b) by 0 days.

(21) Appl. No.: 14/694,905

(22) Filed: Apr. 23, 2015

(65) Prior Publication Data
US 2016/0316544 A1    Oct. 27, 2016

(51) Int. Cl.
| | |
|---|---|
| H05B 37/02 | (2006.01) |
| H02J 7/00 | (2006.01) |
| H02J 7/02 | (2016.01) |
| H04M 19/04 | (2006.01) |
| G06F 1/16 | (2006.01) |

(52) U.S. Cl.
CPC ....... *H05B 37/0227* (2013.01); *G06F 1/1628* (2013.01); *G06F 1/1632* (2013.01); *H02J 7/0047* (2013.01); *H02J 7/025* (2013.01); *H04M 19/048* (2013.01)

(58) Field of Classification Search
CPC ...... G06F 1/1628; G06F 1/1632; H02J 7/025; H04M 19/048
See application file for complete search history.

(56) References Cited

U.S. PATENT DOCUMENTS

| | | | |
|---|---|---|---|
| 8,390,255 B1 | 3/2013 | Fathollahi | 320/115 |
| 8,796,989 B2 | 8/2014 | Lee et al. | |
| 8,981,713 B2 | 3/2015 | Lee et al. | |
| 2009/0072782 A1* | 3/2009 | Randall | G06F 1/1616 320/107 |
| 2011/0074344 A1 | 3/2011 | Park et al. | |
| 2012/0043932 A1* | 2/2012 | Nakama | H02J 7/0004 320/108 |
| 2012/0077548 A1* | 3/2012 | Goldberg | G06F 1/1626 455/567 |

(Continued)

FOREIGN PATENT DOCUMENTS

WO    WO 2013/154857    10/2013

*Primary Examiner* — Douglas W Owens
*Assistant Examiner* — Pedro C Fernandez
(74) *Attorney, Agent, or Firm* — McCarter & English, LLP

(57) ABSTRACT

The disclosure herein relates to a method and system for providing device accessory illumination (e.g., glowing, lighting-up, and/or other illumination) based on device-related information. In some implementations, illumination may be provided at a device case (of a device) that interfaces with a charging device based on a charge status of the device, communication information of the device, and/or application information of the device. As an example, an illumination status for the device case may be determined based on the charge status of the device, the communication information, and/or the application information. Illumination may then be provided at the device case based on the illumination status. The illumination status may, for instance, indicate an amount, a color, a pattern, a time feature, a location, and/or other characteristic.

20 Claims, 11 Drawing Sheets

(56) References Cited

U.S. PATENT DOCUMENTS

| | | | |
|---|---|---|---|
| 2012/0302294 A1* | 11/2012 | Hammond | H04M 1/18 455/567 |
| 2013/0143519 A1 | 6/2013 | Doezema | 455/404.2 |
| 2014/0021909 A1* | 1/2014 | Klawon | H02J 7/0042 320/108 |
| 2014/0073378 A1* | 3/2014 | Coverstone | H04M 19/048 455/575.8 |
| 2014/0172561 A1 | 6/2014 | Moon et al. | |
| 2014/0375258 A1 | 12/2014 | Arkhipenkov et al. | |
| 2015/0195397 A1 | 7/2015 | Rice | |
| 2015/0288421 A1* | 10/2015 | Nambord | G06F 1/1632 455/41.1 |

* cited by examiner

SYSTEM AND METHOD FOR PROVIDING DEVICE ACCESSORY ILLUMINATION BASED ON DEVICE-RELATED INFORMATION

FIELD

The disclosure relates to a system and method for providing device accessory illumination based on device-related information, and, more particularly, to providing illumination at a device case (or other accessory) of a device based on device-related information associated with the device.

BACKGROUND

Mobile device cases may be used for protection, aesthetic reasons, and/or other purposes. Typically, mobile device cases are independent from a mobile device and do not interact with it. As a result, mobile device cases generally do not provide a user with information related to the status and/or other device-related information of the mobile device. Likewise, many standard charging devices may only interact with a mobile device by providing a charge to the mobile device. For example, typical charging devices plug into an outlet at one end and the mobile device to be charged at the other end, but do not provide a user with information related to the status and/or device-related information of the mobile device. For example, to determine the battery level of the mobile device, the user may have to look at the screen of the mobile device. These and other drawbacks exist.

SUMMARY

One aspect of the disclosure relates to a system and method for providing device accessory illumination based on device-related information, in accordance with one or more implementations. In some implementations, the system may cause illumination (e.g., glowing, lighting-up, and/or other illumination) to be provided at a device case of a device (e.g., a client device or other device) and/or other device accessories (e.g., a charging device, an object attachable to the device or the device case, etc.). The illumination may be provided based on an illumination status. The illumination status may describe the manner in which the illumination is provided. For example, the illumination status may indicate an amount, a color, a pattern, a time feature, a location, and/or other characteristics of the illumination. By way of non-limiting example, an illumination status may indicate an amount of illumination (e.g., brightness) that is provided around a top edge of the device case (e.g., surrounding the screen of the device coupled with the device case). The illumination status may be determined based on various factors, for example, a charge status of the device, communication information (e.g., incoming, received, and/or missed calls, text messages, email, voicemail, etc.) of the device, application information (e.g., a command from an application, a characteristic of an activity of an application, a type of application, etc.) of the device, and/or other factors.

For example, a charge status of a device may indicate a battery level of the device and/or that a charging device is currently providing a charge to the device. In some implementations, the device case and/or other device accessory may be configured to illuminate based on one or more charging devices providing a charge to the device. The one or more charging devices may include, for example, a plug in charger, a docking station, an induction charger, a charging pad and/or surface (e.g., a surface configured to provide wireless charging at a public location), and/or other charging devices providing a charge to the device As such, for example, illumination may be provided at a device case of the device (e.g., a device case that is removably coupled to the device) based on the charge status of the device.

In some implementations, a device case may be configured to interface with a charging device. As such, for example, illumination may be provided at both the device case and the charging device. The illumination that is to be provided at the charging device may be indicated by an illumination status. The illumination status indicating illumination for the charging device may or may not be the same as the illumination status indicating illumination for the device case. For example, the illumination status (e.g., for the charging device) may be determined based on a charge status of the device able to be charged by the charging device, communication information of the device, application information of the device, and/or other factors. As such, for example, illumination may be provided at the charging device configured to charge the device based on the charge status of the device.

In some implementations, illumination may be provided at the device case and/or the charging device based on an illumination status that is at least partially based on communication information, application information, and/or other information. For example, communication information may describe an incoming, a received, and/or a missed communication item. The communication item may include a phone call, a text message, an email, a voicemail, and/or other communication items that may be received at the device that couples with the device case and/or may be charged by the charging device.

The application information may include a command from the application, a characteristic of an activity of the application, a type of application, and/or other application information. For example, an illumination status indicating a pattern of illumination may be determined based on the rhythm of a song being played by an application (e.g., an activity of the application) on the device.

In some implementations, the charging device may include an indication charger. As such, the charging device may include one or more surfaces that a user may place the device on in order to charge the device. In some implementations, for example, the charge status of the device may indicate that the device is charging (e.g., a transfer of energy is occurring between the device and the charging device) when the device is placed on a charging surface of the charging device. By way of a non-limiting use example, the charge status may indicate proximity of the device to the charging device. Continuing the example, the illumination status may indicate illumination that is to be provided at the charging device based on the proximity of the device to the charging device causing at least a portion of the charging device to illuminate.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION

FIGS. 1A-1D illustrate a system 100 for providing device accessory illumination based on device-related information, in accordance with an implementation. System 100 may be configured to cause illumination to be provided at a device case 136, a client device 138, a charging device 140, or other objects (e.g., a sticker or other attachable object, other device accessories, etc.). As an example, the system may cause illumination (e.g., glowing, lighting-up, and/or other illumination) to be provided at device case 136. Illumination may be provided based on an illumination status. The illumination status may describe the manner in which the illumination is to be provided. For example, the illumination status may indicate an amount (e.g., brightness), a color, a pattern, a time feature, a location, and/or other characteristics of the illumination. The illumination status may be determined based on various factors, for example, a charge status of client device 138, communication information (e.g., incoming, received, and/or missed calls, text messages, email, voicemail, etc.), application information (e.g., a command from an application, a characteristic of an activity of an application, a type of application, etc.), and/or other factors.

Device case 136 may be configured to be removably coupled to client device 138. Charging device 140 may be configured to charge client device 138. In some implementations, device case 136 may be configured to interface with charging device 140. As such, by way of a non-limiting use example, illumination may be provided at device case 136 and/or charging device 140. A first illumination that may be provided at device case 136 may be indicated by a first illumination status. A second illumination that may be provided at charging device 140 may be indicated by a second illumination status. The second illumination status indicating illumination for charging device 140 may, or may not, be the same as the first illumination status indicating illumination for device case 136. For example, the illumination statuses may be determined based on a charge status of client device 138, communication information, application information, and/or other factors.

Figure 1A:
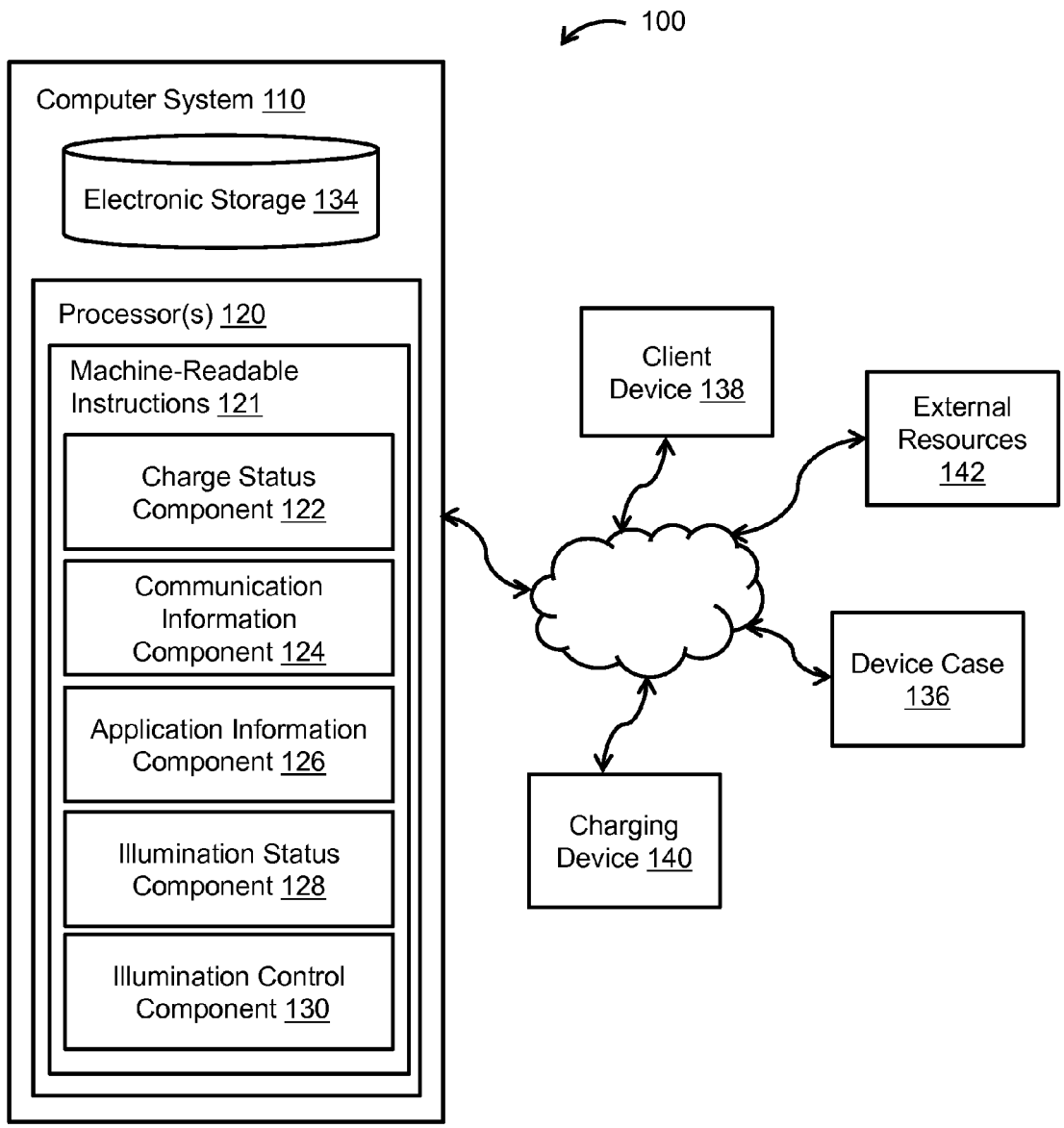
FIGS. 1A-1D illustrate a system for providing device accessory illumination based on device-related information, in accordance with various implementations.
Figure 1B:
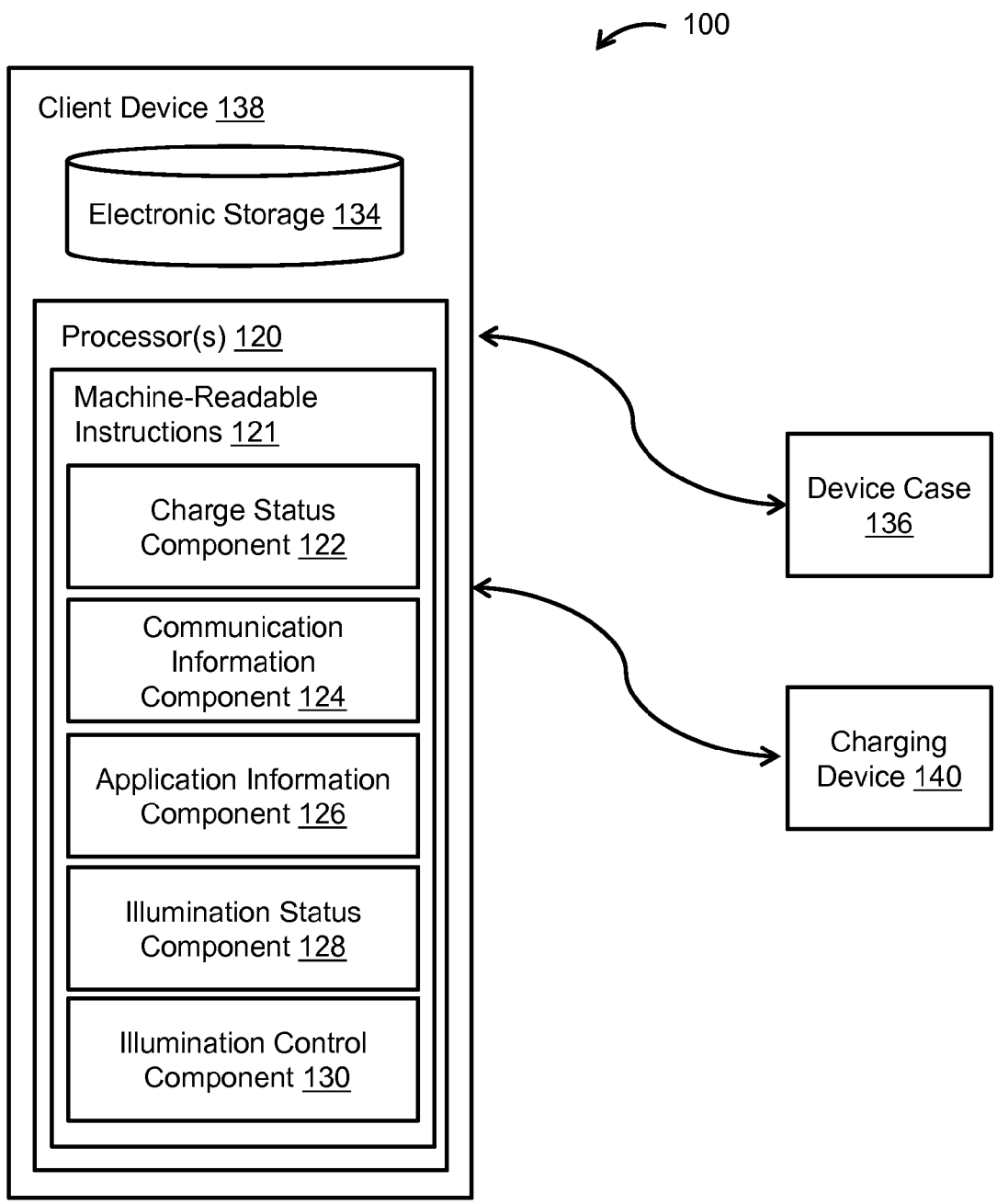
Figure 1C:
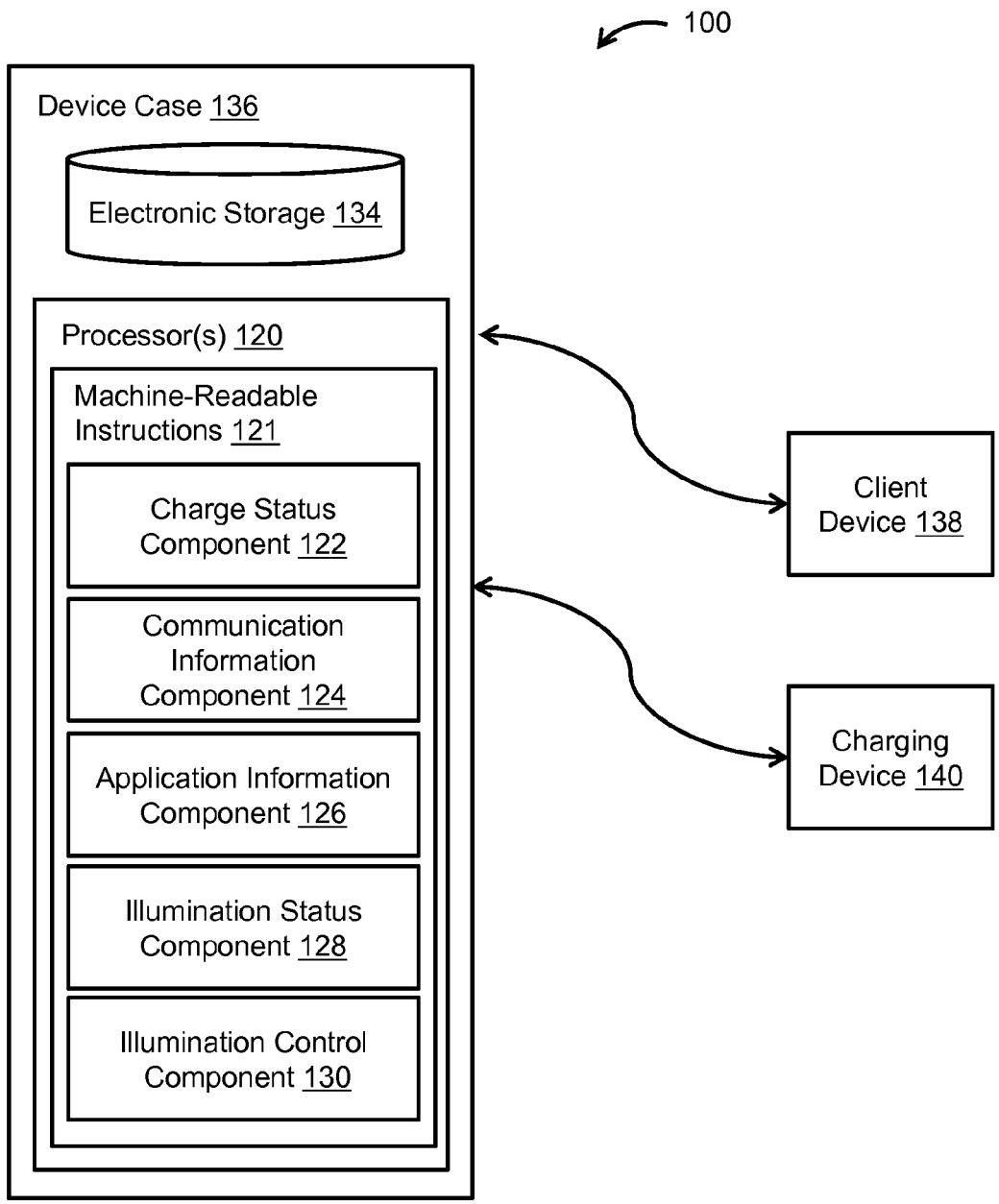
Figure 1D:
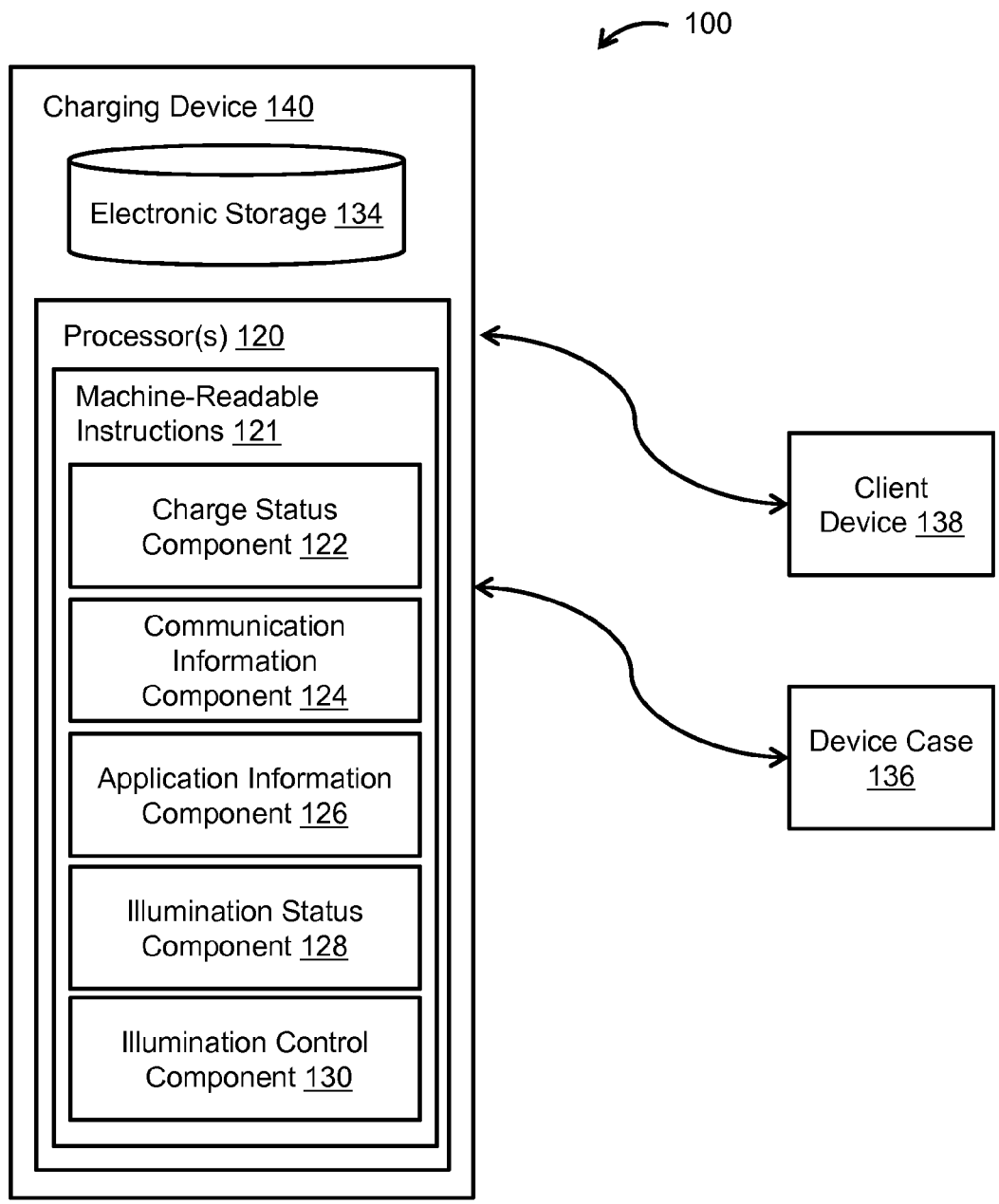

System 100 may include a computer system 110. Computer system 110 may be configured to communicate with device case 136, charging device 140, client device 138, external resources 142, or other components of system 100 according to a peer-to-peer architecture, client/server architecture, server/server architecture, and/or other architectures. In some implementations, computer system 100 may be client device 138, charging device 140, or other device (e.g., a network server, other network device, etc.). As an example, as illustrated in FIG. 1B, computer system 110 may be client device 138, and client device 138 may perform one or more of the operations described herein. As another example, as illustrated in FIG. 1C, computer system 110 may be device case 136, and device case 136 may perform one or more of the operations described herein. As yet another example, as illustrated in FIG. 1D, computer system 110 may be charging device 140, and charging device 140 may perform one or more of the operations described herein.

Computer system 110 (e.g., device case 136, client device 138, charging device 140, or other device) may be configured to execute machine-readable instructions 121. Machine-readable instructions 121 may include a charge status component 122, a communication information component 124, an application information component 126, an illumination status component 128, an illumination control component 130, and/or other components.

Charge Status

Charge status component 122 may be configured to obtain a charge status of client device 138. Client device 138 may include a mobile device, a smartphone, a camera (e.g., digital, video, etc.), a tablet, a laptop computer, a handheld computer, a netbook, a gaming console, and/or other devices. A charge status may indicate whether client device 138 is receiving a charge via charging device 140 and/or other charging devices. For example, the charge status of client device 138 may indicate that client device 138 is currently charging (e.g., a transfer of energy is occurring between client device 138 and charging device 140). In some implementations, the charge status may indicate a battery level of client device 138. A battery level may describe a charge percentage, an amount of time and/or battery remaining, and/or other battery level information.

By way of non-limiting example, a charge status of client device 138 may indicate that client device 138 is currently charging and an illumination status based on the charge status may cause device case 136 to illuminate green. By way of another non-limiting example, a charge status of client device 138 may indicate that client device 138 has 15% battery remaining (e.g., while device 138 is coupled with and/or receiving a charge from a charging device, and/or while device 138 is separate and/or not receiving a charge from a charging device) and an illumination status based on the charge status may cause device case 136 to illuminate red at a low amount (e.g., brightness). In some implementations, the charge status of client device 138 may be obtained at one or more intervals. In an implementation, for example, responsive to client device 138 being charged, a subsequent charge status of client device 138 obtained by charge status component 122 may indicate that client device 138 has 55% battery remaining (e.g., increased from 15%) and the illumination status based on the charge status may cause device case 136 to illuminate red at a medium amount (e.g., brightness). In another implementation, responsive to the subsequent charge status of client device 138 indicating that client device 138 has 55% battery remaining (e.g., increased from 15%), the illumination status based on the charge status may cause device case 136 to illuminate yellow at a low amount (e.g., brightness).

In some implementations, illumination may be provided at both device case 136 and charging device 140. Thus, in some implementations, the charge status of client device 138 obtained by charge status component 122 may be a basis for determining a second illumination status that indicates illumination that is to be provided at charging device 140. By way of non-limiting example, responsive to the charge status of client device 138 indicating that charging device 140 is currently charging client device 138, a second illumination status based on the charge status may be determined and may cause at least a portion of charging device 136 to illuminate red.

In some implementations, charging device 140 may include an induction charger. As such, charging device 140 may include one or more surfaces on which a user may place client device 138 to charge. Therefore, for example, the charge status of client device 138 may indicate that client device 138 is disposed on a charging surface of charging device 140 and/or that charging device 140 is currently charging client device 138. For example, responsive to the charge status of client device 138 indicating that client device 138 is disposed on the charging surface of charging device 140, and/or that charging device 140 is currently charging client device 138, an illumination status based on the charge status may be determined and may cause at least a portion (e.g., the charging surface) of charging device 140 to illuminate a blue light (or other color light). In some implementations, the charge status may indicate proximity of client device 138 to charging device 140. For example, the charge status may indicate that client device 138 is within a foot (or other preconfigured range) of charging device 140. Continuing the example, a second illumination status based on the charge status may cause charging device 140 to illuminate green.

In some implementations, charge status component 122 may be configured to obtain a charge status of client device 138 that indicates client device 138 needs to be charged (e.g., has a battery level below a predetermined amount). As such, for example, responsive to the charge status of client device 138 indicating that client device 138 is has less than 20% battery, a second illumination status based on the charge status may be determined and may cause at least a portion (e.g., the charging surface) of charging device 140 to illuminate yellow.

In some implementations, illumination based on charge status may only be provided at one or more of device case 136, charging device 140, client device 138, and/or other objects (e.g., other device accessories of client device 138 other than device case 136 and charging device 140) responsive to client device 138 receiving a charge from a charging device (e.g., charging device 140 and/or other charging devices). In some implementations, illumination based on charge status may be provided at one or more of device case 136, charging device 140, client device 138, and/or other objects at any time responsive to device case 136, charging device 140, and/or the device accessory communicating with client device 138 to obtain the charge status.

Communication and/or Application Information

In some implementations, illumination may be provided at device case 136 and/or charging device 140 based on an illumination status that is at least partially based on communication information, application information, and/or other information.

Communication information component 124 may be configured to obtain communication information. Communication information may be related to an incoming communication item, a received communication item, a missed communication item, and/or other communication item. For example, communication information may indicate an incoming, a received, and/or a missed communication item. The communication item may include a phone call, a text message, an email, a voicemail, and/or other communication items that may be received at client device 138 that couples with device case 136 and/or may be charged by charging device 140. For example, communication information may indicate the receipt of a text message at client device 138. Continuing the example, the communication information may be at least a partial basis for determining an illumination status that indicates a brief (e.g., a flash) red illumination at device case 136 and/or charging device 140. As such, the receipt of a text message may cause device case 136 and/or charging device 140 to illuminate red briefly (e.g., a red flash of light).

Application information component 126 may be configured to obtain application information associated with an application of client device 138. The application information may include a command from the application, a characteristic of an activity of the application, a type of the application, and/or other application information. A command from the application may include one or more commands and/or instructions describing illumination that should be provided at client device 138, charging device 140, and/or device case 136. As such, one or more applications may be developed (e.g., independently from system 100 and/or for use with system 100) to provide commands to system 100 for various illuminations.

In some implementations, illumination based on one or both of communication information or application information may only be provided at one or more of device case 136, charging device 140, client device 138, and/or other objects (e.g., other device accessories of client device 138 other than device case 136 and charging device 140) responsive to client device 138 receiving a charge from a charging device (e.g., charging device 140 and/or other charging devices). In some implementations, illumination based on one or both of communication information or application information may be provided at one or more of device case 136, charging device 140, client device 138, and/or other objects at any time responsive to device case 136, charging device 140, and/or the device accessory communicating with client device 138 to obtain information.

By way of non-limiting example, a social media application (e.g., Facebook®) may provide a command to application information component 126 when the user associated with client device 138 receives a notification (e.g., a Facebook® friend commented on the user's status). Continuing the example, the command from the social media application may be obtained by application information component 126 and used as a basis for determining an illumination status that is a basis for causing illumination at device case 136 and/or charging device 140.

A characteristic of an activity of the application may describe an activity within and/or content of an application. For example, a characteristic of a music-playing application may include the rhythm and/or tone of the song playing. By way of another example, a characteristic of a weather application may include that the forecast is rain. Thus, a characteristic of an activity of the application may be used to determine, for example, an illumination status indicating a pattern of illumination (e.g., having a variety of colors and/or amounts/brightness) having a rhythm that may be determined based on the rhythm of a song being played by an application (e.g., a characteristic of an activity of the application) on client device 138. Continuing the example, the illumination status may cause device case 136 and/or charging device 140 to illuminate with various colors and/or amounts (e.g., brightness) in a pattern that may correspond to the rhythm of the song.

A type of application may describe an activity performed via the application and/or the purpose of the application. For example, the type of application may include a photography application, a video application, a gaming application, an information application, and/or other types of applications. For example, a photography application type may be used, to determine an illumination status indicating a constant, low, and white illumination that may cause device case 136 and/or charging device 140 to illuminate with a constant, low, and white illumination (e.g., to provide backlighting and/or other lighting while the photography application is in use).

Illumination Status and Providing Illumination

Illumination status component 128 may be configured to determine illumination statuses for illuminations to be provided at device case 136, charging device 140, and/or client device 138. The one or more illumination status may be based on a charge status of client device 138 (e.g., obtained from charge status component 122), communication information (e.g., obtained by communication information component 124), application information (e.g., obtained by application information component 126), and/or other information. The illumination status may indicate an amount of illumination (e.g., brightness), a color of illumination, a pattern of illumination, a time feature illumination (e.g., whether the illumination is continuous or non-continuous, and/or how long the illumination is to be provided), a location of illumination, and/or other characteristics of the illumination. A location of illumination may include a location on one or more of device case 136 and/or charging device 140, for example, at one or more edges, on a back, on one or more side panels, at a top, at a bottom, on a surface, and/or at other locations. By way of non-limiting example, an illumination status may indicate an amount of illumination (e.g., brightness) and/or a location of illumination (e.g., around a top edge of device case 136) that is provided at device case 136. By way of non-limiting example, an illumination status may indicate a pattern of illumination including various colors, varying amounts (e.g., brightness), various times, and/or various locations. Illumination status components 128 may be configured to communicate with charge status component 122, communication information component 124, application information component 126, illumination control component 130, and/or other components to obtain information for determining one or more illumination status.

In some implementations, responsive to charging device 140 and device case 136 both providing illumination, the illumination status indicating illumination for charging device 140 (e.g., a second illumination status) may be different than the illumination status (e.g., a first illumination status) indicating illumination for device case 136. For example, the charge status may indicate a battery level of client device 138 and/or that charging device 140 is currently providing a charge to client device 138. As such, the first illumination status may indicate that a red illumination in an amount corresponding to the current battery level (e.g., a low level/brightness for a low battery charge, a medium level/brightness for medium battery charge, a high level/ brightness for a full to almost full battery, etc.) of client device 138 based on the charge status may be provided at device case 136 which may cause a portion of device case 136 to illuminate red at a medium amount (e.g., brightness) responsive to the battery level of client device 138 being near 50%. Continuing the example, the second illumination status based on the charge status may indicate that a yellow illumination having a low brightness level may be provided at charging device 140 which may cause a portion of charging device 140 (e.g., a top surface) to illuminate at a low brightness with a yellow color.

In some implementations, responsive to the charge status being obtained at one or more intervals (e.g., by charge status component 122), an illumination status based on a charge status including a battery level for client device 138 of less than 10% may indicate a red illumination to be provided at device case 136 and/or charging device 140. Continuing the example, responsive to a subsequent charge status of client device 138 indicating that client device 138 has 55% battery remaining (e.g., increased from 10%); the illumination status may indicate a yellow illumination to be provided at device case 136 and/or charging device 140. Further continuing the example, responsive to another subsequent charge status of client device 138 indicating that client device 138 has 95% battery remaining (e.g., increased from 55%); the illumination status may indicate a green illumination to be provided at device case 136 and/or charging device 140. In some implementations, illumination status may indicate a change in illumination amount (e.g., brightness) instead of, and/or in addition to, a change in color based on the changing charge status.

Illumination control component 130 may be configured to cause illumination to be provided at device case 136, charging device 140, and/or client device 138. Illumination may be caused based on one or more illumination statuses (e.g., determined by illumination status component 128). Illumination may be caused by one or more LED lights, other lights, and/or other illumination technology. In some implementations, causing one or more illuminations may cause one or more portions of device case 136, charging device 140, and/or client device 138 to glow, light-up, and/or otherwise be illuminated based on one or more illumination statuses.

In some implementations, illumination may be provided at device case 136 (and/or other device accessories) at various times and/or consistently based on the illumination status. For example, in some implementations, illumination may be provided at device case 136 responsive to client device 138 receiving a charge. By way of non-limiting example, responsive to client device 138 receiving a charge from a wireless charging table/surface at a coffee shop (e.g., when client device 138 is placed on the wireless charging table/surface), device case 136 may be illuminated.

In some implementations, the system described herein may comprise client device 138 (e.g., a mobile device) such that client device 138 includes the one or more physical processors recited by the claims. For example, system 100 may include an application downloaded on client device 138 such that machine-readable instructions 121 may be carried out by one or more physical processors of client device 138. In some implementations, the system described herein may comprise charging device 140 (e.g., an induction charger) such that charging device 140 includes the one or more physical processors recited by the claims. As such, for example, machine-readable instructions 121 may be carried out by one or more physical processors of charging device 140. In some implementations, the system described herein may comprise device case 136 (e.g., a mobile device case) such that device case 136 includes the one or more physical processors recited by the claims. As such, for example, machine-readable instructions 121 may be carried out by one or more physical processors of device case 136. In some implementations, the system described herein may include client device 138, charging device 140, and/or device case 136. As such, for example, machine-readable instructions 121 may be carried out at multiple locations in whole or in part by one or more physical processors of client device 138, charging device 140, device case 136, and/or external resources 142.

In some implementations, client device 138, device case 136, charging device 140, external resource(s) 142, or other components of system 100 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which client device 138, device case 136, charging device 140, external resource(s) 142, or other components of system 100 may be operatively linked via some other communication media.

A client device 138 may include one or more processors configured to execute machine-readable instructions. By way of non-limiting example, client device 138 may include a mobile device, a smartphone, a camera, a tablet, a laptop computer, a handheld computer, a netbook, a gaming console, and/or other devices. Charging device 140 may include an induction charger, a plug-in charger, a docking station charger, a charging pad and/or surface, and/or other charging devices.

External resource(s) 142 may include sources of information, hosts and/or providers of transaction platforms outside of system 100, external entities participating with system 100, and/or other resources. In some implementations, some or all of the functionality attributed herein to external resource(s) 142 may be provided by resources included in system 100.

Computer system 110 may include electronic storage 134, one or more processor(s) 120, and/or other components. The illustration of computer system 110 in FIG. 1A is not intended to be limiting. Computer system 110 may include a plurality of hardware, software, and/or firmware components operating together to provide the functionality attributed herein to computer system 110.

Electronic storage 134 may comprise non-transitory storage media that electronically stores information. The electronic storage media of electronic storage 134 may include system storage that is provided integrally (i.e., substantially non-removable) with a respective component of system 100 and/or removable storage that is removably connectable to a respective component of system 100 via, for example, a port (e.g., a USB port, a firewire port, etc.) or a drive (e.g., a disk drive, etc.). Electronic storage 134 may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by a processor, and/or other information that enables components of system 100 to function as described herein.

Processor(s) 120 may be configured to provide information processing capabilities in computer system 110. As such, processor(s) 120 may include a digital processor, an analog processor, a digital circuit designed to process information, an analog circuit designed to process information, a state machine, and/or other mechanisms for electronically processing information. Although processor(s) 120 is shown in FIGS. 1A-1D as a single entity, this is for illustrative purposes only. In some implementations, processor(s) 120 may include a plurality of processing units. The processor(s) 120 may be configured to execute machine-readable instructions 121. Machine-readable instructions 121 may include components 122, 124, 126, 128, 130, and/or other components. The processor(s) 120 may be configured to execute components 122, 124, 126, 128, 130, and/or other components by software; hardware; firmware; some combination of software, hardware, and/or firmware; and/or other mechanisms for configuring processing capabilities on processor(s) 120.

The description of the functionality provided by the different components 122, 124, 126, 128, and/or 130 described herein is for illustrative purposes, and is not intended to be limiting, as any of components 122, 124, 126, 128, and/or 130 may provide more or less functionality than is described. For example, components 122, 124, 126, 128, and/or 130 may be eliminated, and some or all of its functionality may be provided by other ones of components 122, 124, 126, 128, and/or 130. As another example, processor(s) 120 may be configured to execute one or more additional computer readable instruction components that may perform some or all of the functionality attributed below to one of components 122, 124, 126, 128, and/or 130.

Example Implementations

Figure 2:
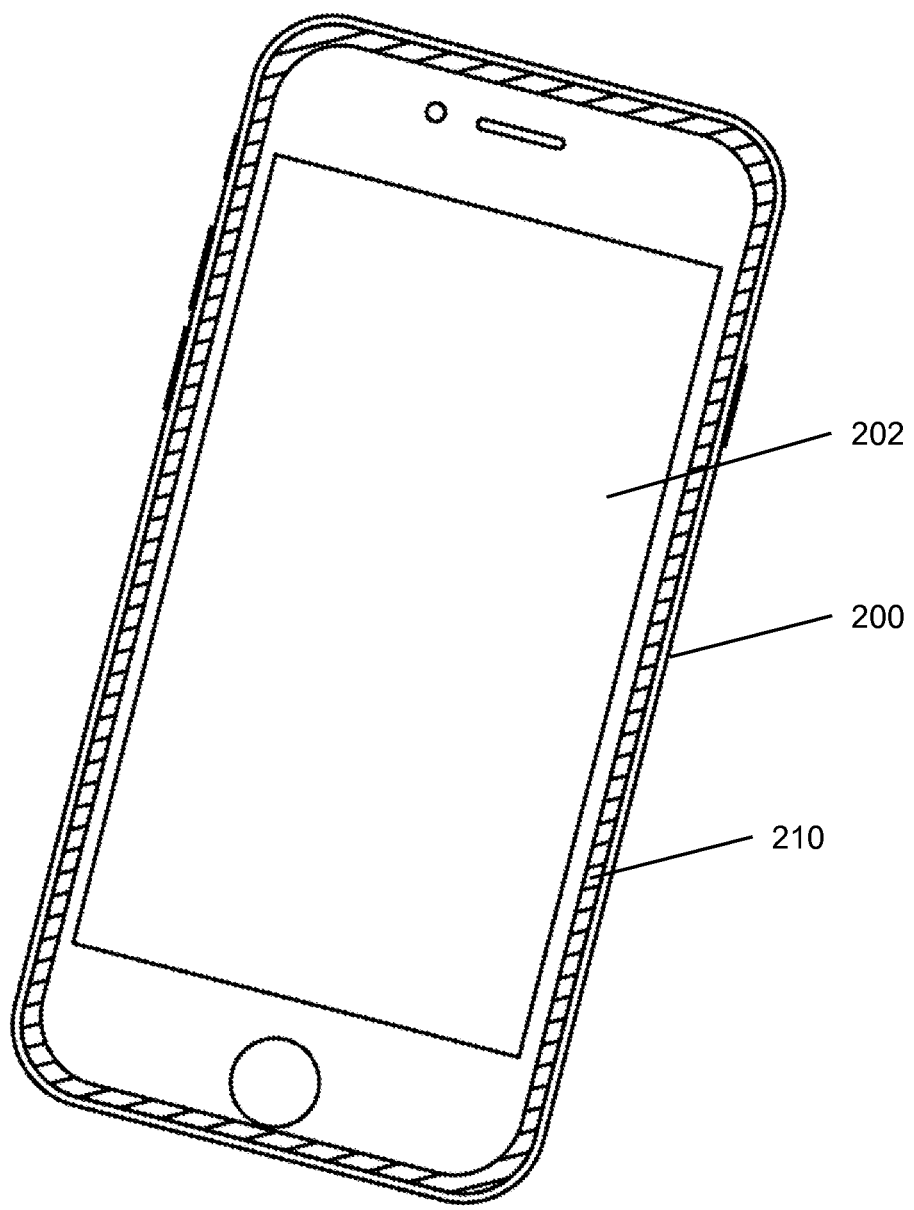
FIG. 2 illustrates a device case, in accordance with one or more implementations.

FIG. 2 illustrates a device case 200, in accordance with various implementations. Device case 200 may be the same as or similar to device case 136 (see FIGS. 1A-1D), in some implementations. Client device 202 may be the same as or similar to client device 138 in some implementations. Device case 200 may include a first illumination portion 210. One or more illuminations provided at device case 200 (e.g., including a first illumination based on a first illuminations status) may be provided at first illumination portion 210. For example, responsive to the first illumination status (e.g., based on the charge status of client device 202) indicating a pink illumination, first illumination portion 210 may glow blue.

Figure 3:
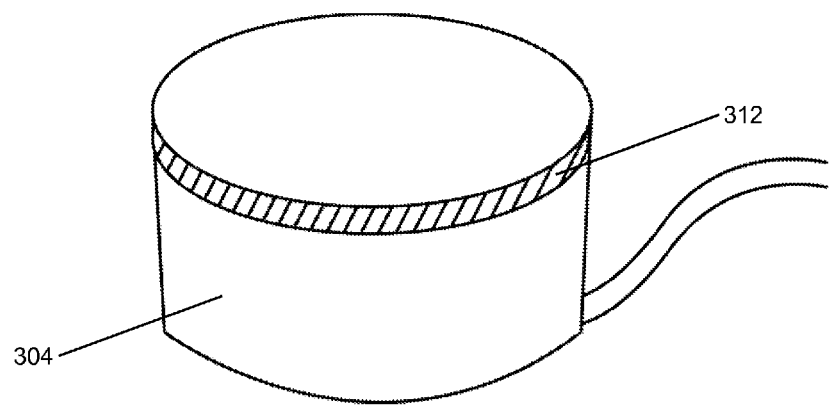
FIG. 3 illustrates a charging device, in accordance with one or more implementations.

FIG. 3 illustrates a charging device 304, in accordance with various implementations. Charging device 304 may be the same as or similar to charging device 140 (see FIGS. 1A-1D), in some implementations. Charging device 304 may include a second illumination portion 312. One or more illuminations provided at charging device 304 (e.g., including a second illumination based on a second illuminations status) may be provided at second illumination portion 312. For example, responsive to the second illumination status (e.g., based on the charge status of a client device) indicating a blue illumination, second illumination portion 312 may glow blue.

Figure 4:
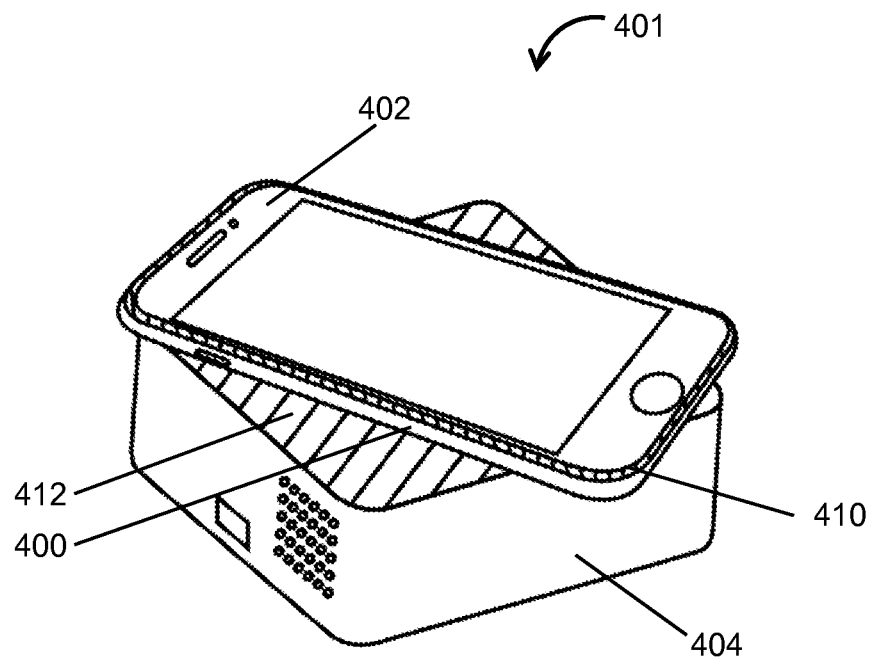
FIG. 4 illustrates a system for providing device accessory illumination based on device-related information, in accordance with one or more implementations.

FIG. 4 illustrates a system 401 for providing device accessory illumination based on device-related information, in accordance with an implementation. System 401 may include one or more of the same and/or similar components as system 100 (see FIGS. 1A-1D), in some implementations. Device case 400 may be the same as or similar to device case 136, in some implementations. Client device 402 may be the same as or similar to client device 138, in some implementations. Charging device 404 may be the same as or similar to charging device 140, in some implementations.

Device case 400 may include a third illumination portion 410. Charging device 404 may include a fourth illumination portion 412. One or more illuminations may be provided at device case 400 and/or charging device 404. For example, the first illumination based on the first illumination status may be provided at third illumination potion 410. Continuing the example, the second illumination based on the second illumination status may be provided at fourth illumination portion 412. By way of non-limiting use example, responsive to both the first illumination status and the second illumination status (e.g., based on the charge status of client device 402) indicating a blue illumination, third illumination portion 410 and fourth illumination portion 412 may glow blue.

Figure 5:
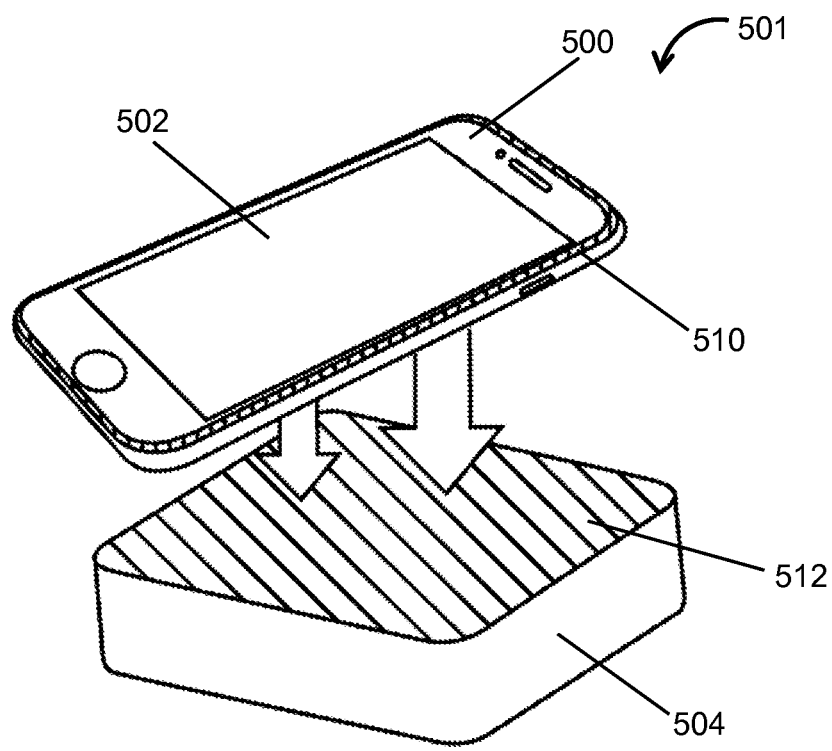
FIG. 5 illustrates a system for generating illumination at a device case and/or a charging device, in accordance with one or more implementations.

FIG. 5 illustrates a system 501 for generating illumination at a device case and/or a charging device, in accordance with an implementation. System 501 may include one or more of the same and/or similar components as system 100 (see FIGS. 1A-1D), in some implementations. Device case 500 may be the same as or similar to device case 136, in some implementations. Client device 502 may be the same as or similar to client device 138, in some implementations. Charging device 504 may be the same as or similar to charging device 140, in some implementations.

Device case 500 may include a fifth illumination portion 510. Charging device 504 may include a sixth illumination portion 512. One or more illuminations may be provided at device case 500 and/or charging device 504. A charge status of client device 502 may indicate that client device 502 is proximate to charging device 504 and/or that client device 502 needs to be charged. A first illumination status and a second illumination status may be determined based on the charge status. As such, the first illumination status may indicate a high amount (e.g., brightness) of red illumination for fifth illumination portion 510. The second illumination status may indicate a low amount (e.g., brightness) of red illumination for sixth illumination portion 512. As such, for example, fifth illumination portion 510 may glow red at a greater brightness than sixth illumination portion 512 glows red.

Figure 6:
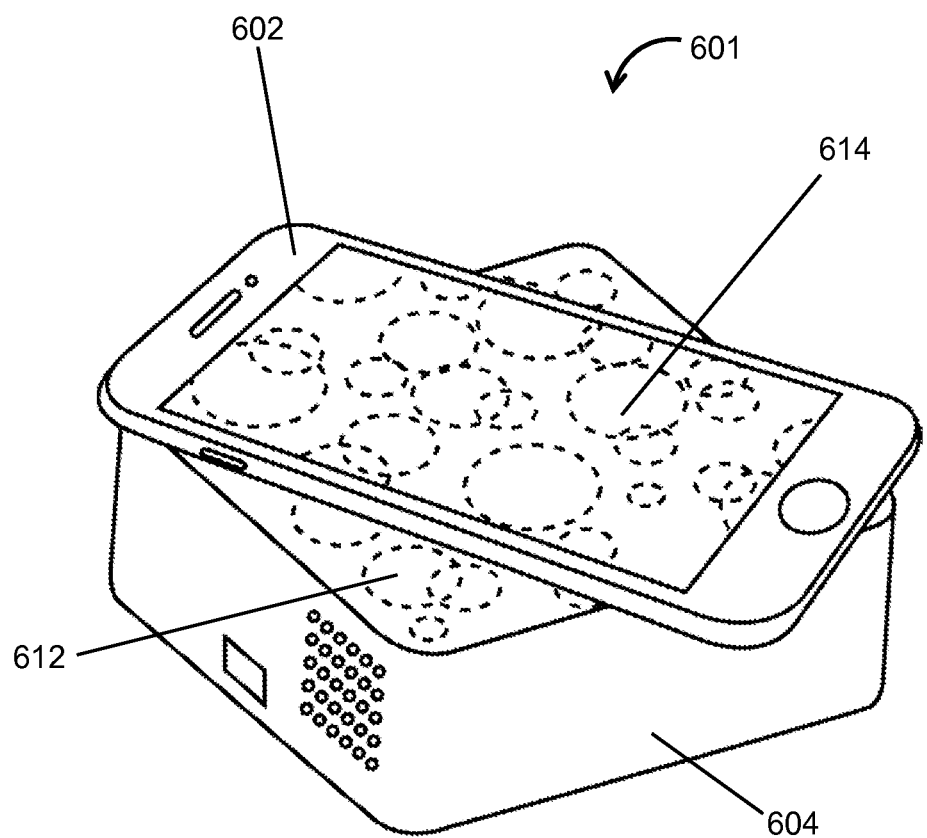
FIG. 6 illustrates a system for generating illumination at a charging device, in accordance with one or more implementations.

FIG. 6 illustrates a system for generating illumination at a charging device, in accordance with an implementation. System 601 may include one or more of the same and/or similar components as system 100 (see FIGS. 1A-1D), in some implementations. Client device 602 may be the same as or similar to client device 138, in some implementations. Charging device 604 may be the same as or similar to charging device 140, in some implementations.

Client device 602 may be configured to interface with charging device 604. One or more illuminations may be provided at client device 602 and/or charging device 604. By way of non-limiting example, a charge status of client device 602, communication information, application information, and/or other information may be obtained by system 601. Client device 602 may include a seventh illumination portion 614 (e.g., the device screen). Charging device 604 may include an eighth illumination portion. One or more illuminations provided at client device 602 may be provided at seventh illumination portion 614 and/or one or more illuminations provided at charging device 604 may be provided at eighth illumination portion 612. As such, for example, charging device 604 may interface with client device 602 without a device case.

In some implementations, a fifth illumination status indicating an illumination that is to be provided at client device 602 may be determined based on the charge status of client device 602, communication information, application information, and/or other information. A sixth illumination status that indicate illumination that is to be provided at charging device 604 may be determined based on the charge status of client device 602, communication information, application information, and/or other information. In some implementations, the fifth illumination status and the sixth illumination status may or may not be the same.

In some implementations, responsive to the fifth illumination status and the sixth illumination status being the same, the same illumination may be provided at client device 602 (e.g., at seventh illumination portion 614) and charging device 604 (e.g., eighth illumination portion 612). By way of non-limiting example, eighth illumination portion 612 may include a screen (e.g., an LCD screen) such that the illumination provided at charging device 604 may mirror the screen (e.g., seventh illumination portion 614) of client device 602.

Figure 7:
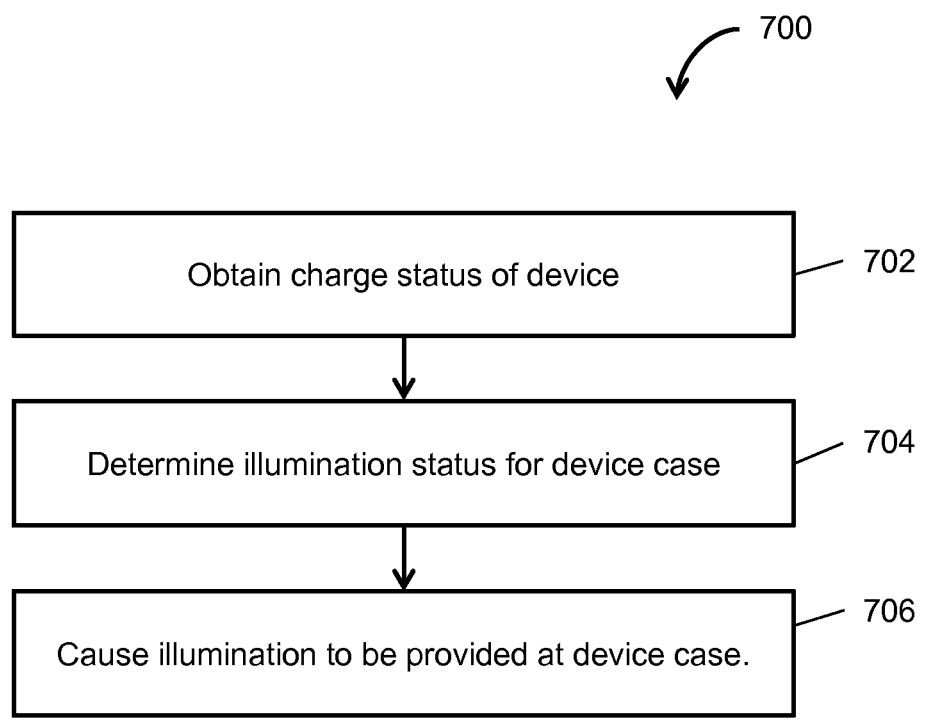
FIGS. 7-9 illustrate methods for providing device accessory illumination based on device-related information, in accordance with various implementations.

FIG. 7 illustrates a method 700 for providing device accessory illumination based on device-related information, according to an implementation. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices programmed through hardware, firmware, and/or software to be specifically designed for execution of one or more of the operations of method 700.

At operation 702, a charge status of a first device may be obtained. A device case (e.g., that interfaces with a charging device) may be removably coupled to the first device. Operation 702 may be performed by a charge status component that is the same as or similar to charge status component 122, in accordance with one or more implementations.

At operation 704, a first illumination status may be determined. The first illumination status may be determined for the device case. The first illumination status may be determined for the device case based on the charge status of the first device. The first illumination status may indicate an illumination that is to be provided at the device case. Operation 704 may be performed by an illumination status component that is the same as or similar to illumination status component 128, in accordance with one or more implementations.

At operation 706, a first illumination may be caused to be provided at the device case. The first illumination may be based on the determined first illumination status. Operation 706 may be performed by an illumination control component that is the same as or similar to illumination control component 130, in accordance with one or more implementations.

Figure 8:
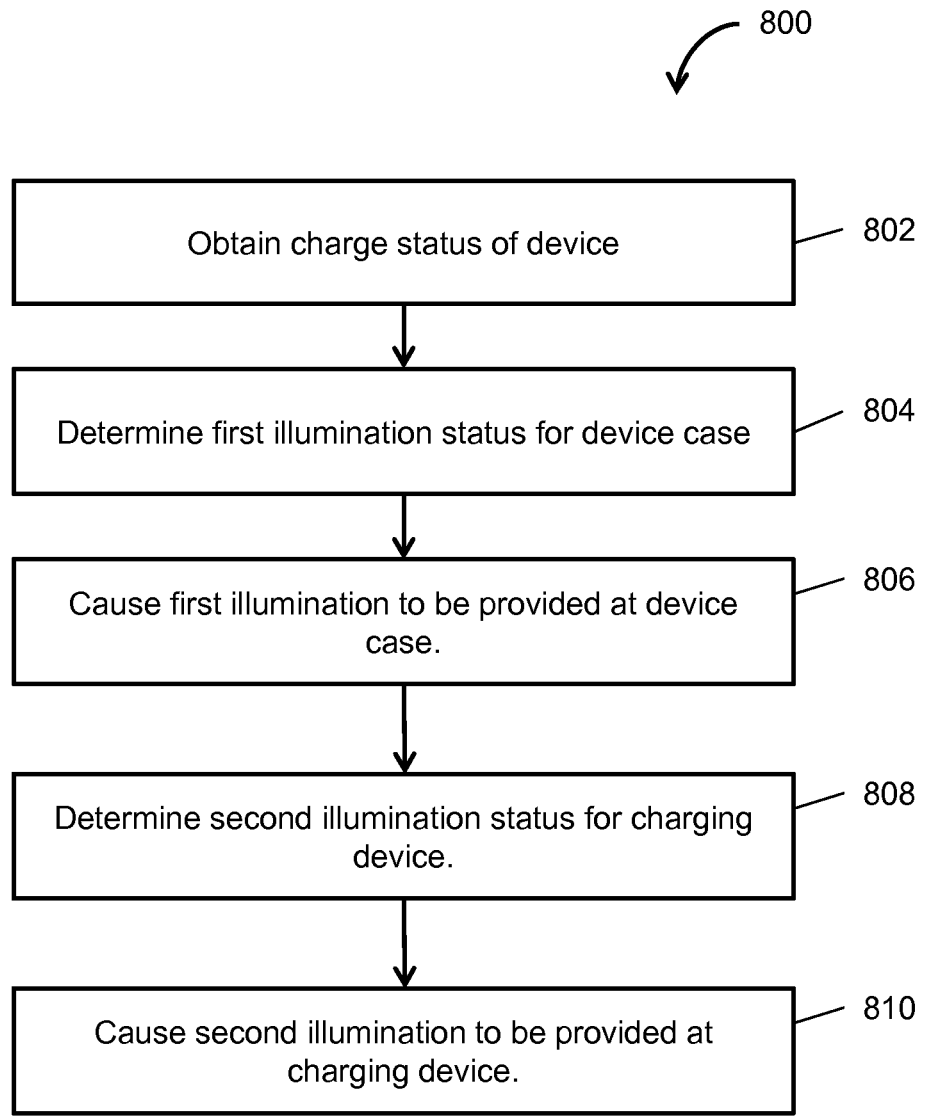

FIG. 8 illustrates a method 800 for providing device accessory illumination based on device-related information, according to an implementation. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices programmed through hardware, firmware, and/or software to be specifically designed for execution of one or more of the operations of method 800.

At operation 802, a charge status of a first device may be obtained. Operation 802 may be performed by a charge status component that is the same as or similar to charge status component 122, in accordance with one or more implementations.

At operation 804, a first illumination status may be determined. The first illumination status may be determined for a device case of the first device. The first illumination status may be determined for the device case based on the charge status of the first device. The first illumination status may indicate an illumination that is to be provided at the device case. Operation 804 may be performed by an illumination status component that is the same as or similar to illumination status component 128, in accordance with one or more implementations.

At operation 806, a first illumination may be caused to be provided at the device case. The first illumination may be based on the determined first illumination status. Operation 806 may be performed by an illumination control component that is the same as or similar to illumination control component 130, in accordance with one or more implementations.

At operation 808, a second illumination status may be determined. The second illumination status may be determined for the charging device. The second illumination status may be determined for the charging device based on the charge status of the first device. The second illumination status may indicate an illumination that is to be provided at the charging device. Operation 808 may be performed by an illumination status component that is the same or similar to illumination status component 128, in accordance with one or more implementations.

At operation 810, a second illumination may be caused to be provided at the charging device. The second illumination may be based on the determined second illumination status. Operation 810 may be performed by an illumination control component that is the same as or similar to illumination control component 130, in accordance with one or more implementations.

Figure 9:
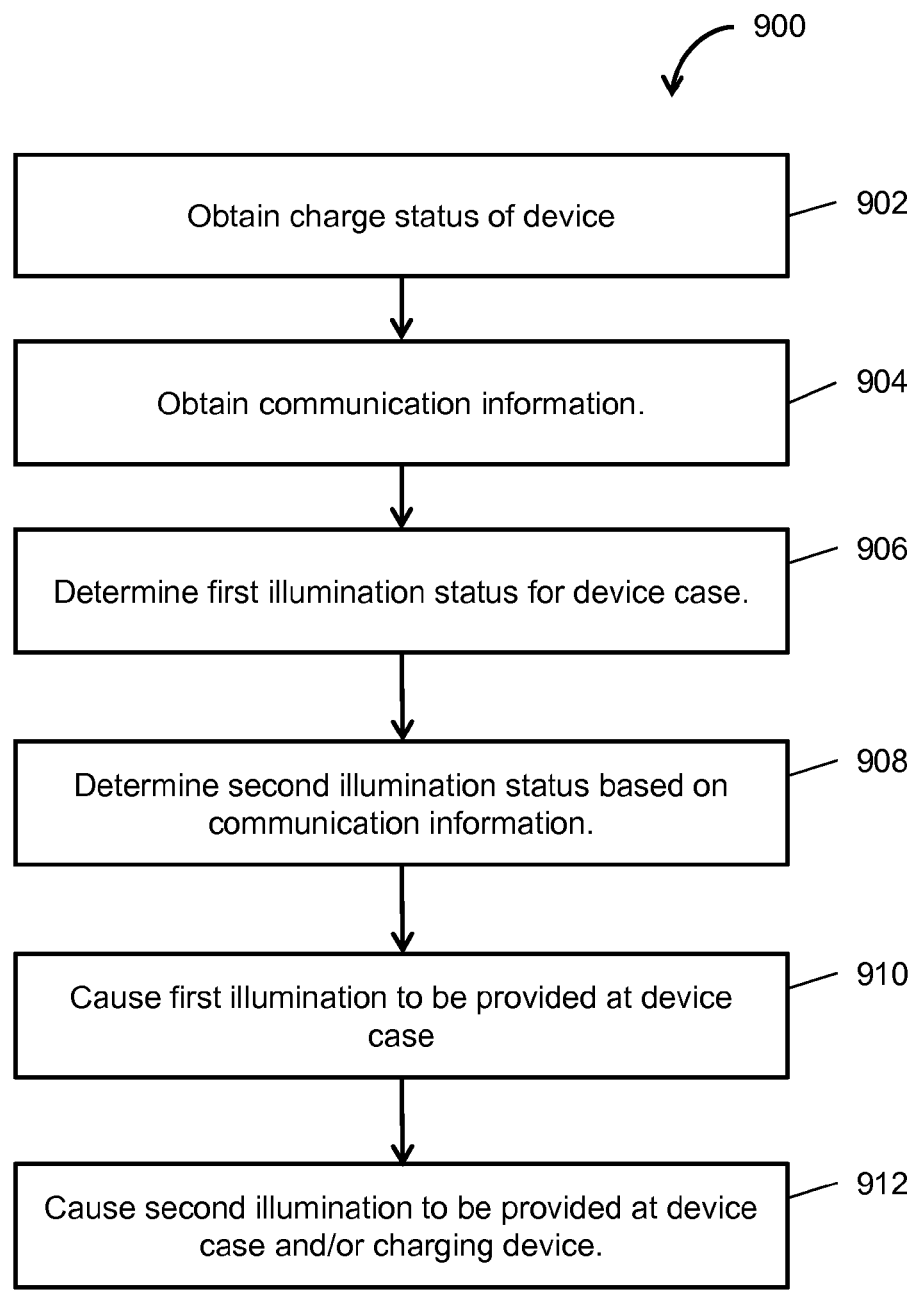

FIG. 9 illustrates a method 900 for providing device accessory illumination based on device-related information, according to an implementation. The operations of method 900 presented below are intended to be illustrative. In some implementations, method 900 may be accomplished with one or more additional operations not described, and/or without one or more of the operations discussed. Additionally, the order in which the operations of method 900 are illustrated in FIG. 9 and described below is not intended to be limiting.

In some implementations, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices programmed through hardware, firmware, and/or software to be specifically designed for execution of one or more of the operations of method 900.

At operation 902, a charge status of a first device may be obtained. Operation 902 may be performed by a charge status component that is the same as or similar to charge status component 122, in accordance with one or more implementations.

At operation 904, communication information may be obtained. Communication information may be related to one or more of an incoming communication item, a received communication item, a missed communication item, and/or other communication items of the first device. Operation 904 may be performed by a communication information component that is the same as or similar to communication information component 124, in accordance with one or more implementations.

At operation 906, a first illumination status may be determined. The first illumination status may be determined for a device case of the first device. The first illumination status may be determined for the device case based on the charge status of the first device. The first illumination status may indicate an illumination that is to be provided at the device case. Operation 906 may be performed by an illumination status component that is the same as or similar to illumination status component 128, in accordance with one or more implementations.

At operation 908, a second illumination status may be determined. The Second illumination status may be based on the communication information. The second illumination status may indicate an illumination that is to be provided at one or both of the device case or the charging device. Operation 908 may be performed by an illumination status component that is the same as or similar to illumination status component 128, in accordance with one or more implementations At operation 910, a first illumination may be caused to be provided at the device case. The first illumination may be based on the determined first illumination status. Operation 910 may be performed by an illumination control component that is the same as or similar to illumination control component 130, in accordance with one or more implementations.

At operation 912, a second illumination may be caused to be provided at one or both of the device case or the charging device. The third illumination may be based on the determined third illumination status. Operation 912 may be performed by an illumination control component that is the same as or similar to illumination control component 130, in accordance with one or more implementations.

Although the system(s) and/or method(s) of this disclosure have been described in detail for the purpose of illustration based on what are currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating illumination comprising:
one or more physical processors configured by machine-readable instructions to:
  (i) obtain a charge status of a first device, wherein a device case is removably coupled to the first device and the first device is interfacing with a charging device;
  (ii) determine a first illumination status for the device case based on the charge status of the first device, wherein the first illumination status indicates an illumination that is to be provided at the device case;
  (iii) cause, based on the determined first illumination status, a first illumination to be provided at the device case;
  (iv) determine a second illumination status for the charging device based on the charge status of the first device, wherein the second illumination status indicates an illumination that is to be provided at the charging device;
  (v) cause, based on the determined second illumination status, a second illumination to be provided at the charging device;
  (vi) determine a third illumination status for the first device based on the charge status of the first device, wherein the third illumination status indicates an illumination that is to be provided at the first device; and
  (vii) cause, based on the determined third illumination status, a third illumination to be provided at the first device;
wherein the charging device includes an induction charger; and
wherein the charge status of the first device indicates a transfer of energy between the first device and the charging device.

2. The system of claim 1, wherein the first illumination status indicates one or more of an amount of the first illumination, a color of the first illumination, a pattern of the first illumination, a time feature of the first illumination, or a location of the first illumination that is to be provided at the device case.

3. The system of claim 1, wherein the charge status of the first device also includes a battery level of the first device, and the illumination status indicates an amount of the first illumination such that, responsive to causing the first illumination to be provided at the device case, at least a portion of the device case is illuminated with the amount of illumination based on the battery level of the first device.

4. The system of claim 1,
wherein the illumination provided at the charging device is provided at a first screen of the charging device;
wherein the illumination provided at the first device is provided at a second screen of the first device; and
wherein the illumination provided at the first screen of the charging device mirrors the illumination provided at the second screen of the first device.

5. The system of claim 1, wherein the first illumination status and the second illumination status are different.

6. The system of claim 1, wherein the one or more physical processors are further configured by machine-readable instructions to:
obtain communication information related to one or more of an incoming communication item, a received communication item, or a missed communication item;
determine a fourth illumination status based on the communication information, wherein the fourth illumination status indicates an illumination that is to be provided at one or both of the device case or the charging device; and
cause, based on the determined fourth illumination status, a fourth illumination to be provided at one or both of the device case or the charging device.

7. The system of claim 6, wherein one or more of the incoming communication item, the received communication item, or the missed communication item includes one or more of a phone call, a text message, an email, or a voicemail.

8. The system of claim 1, wherein the one or more physical processors are further configured by machine-readable instructions to:
obtain application information associated with an application of the first device,
determine a fourth illumination status based on the application information, wherein the fourth illumination status indicates an illumination that is to be provided at one or both of the device case or the charging device; and
cause, based on the determined fourth illumination status, a fourth illumination to be provided at one or both of the device case or the charging device.

9. The system of claim 8, wherein the application information includes one or more of a command from the application, a characteristic of an activity of the application, or an event of the application.

10. The system of claim 1, wherein the illumination provided at the device case surrounds a screen of the first device.

11. The system of claim 1, wherein the charge status of the first device also indicates a proximity of the first device to the charging device.

12. The system of claim 1, wherein the first device includes the one or more physical processors such that the first device: obtains the charge status of the first device, determines the first illumination status for the device case, and causes the first illumination to be provided at the device case.

13. The system of claim 1, wherein the charging device includes the one or more physical processors such that the charging device: obtains the charge status of the first device, determines the first illumination status for the device case, and causes the first illumination to be provided at the device case.

14. The system of claim 1, wherein the device case includes the one or more physical processors such that the device case: obtains the charge status of the first device, determines the first illumination status for the device case, and causes the first illumination to be provided at the device case.

15. A method for generating illumination, the method being implemented by a computer system that includes one or more physical processors executing machine-readable instructions which, when executed, perform the method, the method comprising:
 obtaining, by the computer system, a charge status of a first device, wherein a device case is removably coupled to the first device and the first device is interfacing with a charging device;
 determining, by the computer system, a first illumination status for the device case based on the charge status of the first device, wherein the first illumination status indicates an illumination that is to be provided at the device case;
 causing, by the computer system, based on the determined first illumination status, a first illumination to be provided at the device case;
 determining, by the computer system, a second illumination status for the charging device based on the charge status of the first device, wherein the second illumination status indicates an illumination that is to be provided at the charging device;
 causing, by the computer system, based on the determined second illumination status, a second illumination to be provided at the charging device;
 determining, by the computer system, a third illumination status for the first device based on the charge status of the first device, wherein the third illumination status indicates an illumination that is to be provided at the first device; and
 causing, by the computer system, based on the determined third illumination status, a third illumination to be provided at the first device;
 wherein the charging device includes an induction charger; and
 wherein the charge status of the first device indicates a transfer of energy between the first device and the charging device.

16. The method of claim 15, wherein the first illumination status indicates one or more of an amount of the first illumination, a color of the first illumination, a pattern of the first illumination, a time feature of the first illumination, or a location of the first illumination that is to be provided at the device case.

17. The method of claim 15, wherein the charge status of the first device also includes a battery level of the first device, and the illumination status indicates an amount of the first illumination such that responsive to causing the first illumination to be provided at the device case, at least a portion of the device case is illuminated with the amount of illumination based on the battery level of the first device.

18. The method of claim 15,
 wherein the illumination provided at the charging device is provided at a first screen of the charging device;
 wherein the illumination provided at the first device is provided at a second screen of the first device; and
 wherein the illumination provided at the first screen of the charging device mirrors the illumination provided at the second screen of the first device; and
 wherein the illumination provided at the device case surrounds the second screen of the first device.

19. The method claim 15, wherein the first illumination status and the second illumination status are different.

20. The method of claim 15, further comprising:
 obtaining, by the computer system, communication information related to one or more of an incoming communication item, a received communication item, or a missed communication item;
 determining, by the computer system, a fourth illumination status based on the communication information, wherein the fourth illumination status indicates an illumination that is to be provided at one or both of the device case or the charging device; and
 causing, by the computer system, based on the determined fourth illumination status, a fourth illumination to be provided at one or both of the device case or the charging device.

* * * * *